US012700121B2

(12) United States Patent　　　(10) Patent No.: US 12,700,121 B2
Savvides et al.　　　　　　　　　　(45) Date of Patent:　　*Aug. 4, 2026

(54) SYSTEM AND METHOD FOR USING NON-AXIS ALIGNED BOUNDING BOXES FOR RETAIL DETECTION

(71) Applicant: CARNEGIE MELLON UNIVERSITY, Pittsburgh, PA (US)

(72) Inventors: Marios Savvides, Pittsburgh, PA (US); Chenchen Zhu, Pittsburgh, PA (US); Fangyi Chen, Pittsburgh, PA (US); Han Zhang, Pittsburgh, PA (US)

(73) Assignee: Carnegie Mellon University, Pittsburgh, PA (US)

( * ) Notice: Subject to any disclaimer, the term of this patent is extended or adjusted under 35 U.S.C. 154(b) by 244 days.

This patent is subject to a terminal disclaimer.

(21) Appl. No.: 18/272,754

(22) PCT Filed: Mar. 9, 2022

(86) PCT No.: PCT/US2022/019553
§ 371 (c)(1),
(2) Date: Jul. 17, 2023

(87) PCT Pub. No.: WO2022/211995
PCT Pub. Date: Oct. 6, 2022

(65) Prior Publication Data
US 2024/0104761 A1　　　Mar. 28, 2024

Related U.S. Application Data

(60) Provisional application No. 63/167,709, filed on Mar. 30, 2021.

(51) Int. Cl.
*G06T 7/70*　　　　(2017.01)
*G06V 10/25*　　　(2022.01)
(Continued)

(52) U.S. Cl.
CPC ................ *G06T 7/70* (2017.01); *G06V 10/25* (2022.01); *G06V 10/44* (2022.01); *G06V 10/764* (2022.01); *G06V 2201/07* (2022.01)

(58) Field of Classification Search
CPC .... G06V 10/82; G06V 10/764; G06V 10/454; G06V 20/52; G06V 20/56; G06V 20/58;
(Continued)

(56) References Cited

U.S. PATENT DOCUMENTS 7,020,335 B1　　3/2006　Abousleman
2017/0124415 A1　5/2017　Choi et al.
(Continued)

FOREIGN PATENT DOCUMENTS

WO　　2023107599 A1　6/2023

OTHER PUBLICATIONS

Sheng Yang, Ziqiang Pei, Feng Zhou, and Guoyou Wang. 2020. Rotated Faster R-CNN for Oriented Object Detection in Aerial Images. In Proceedings of the 2020 3rd International Conference on Robot Systems and Applications (ICRSA '20). Association for Computing Machinery, New York, NY, USA, 35-39 (Year: 2020).*
(Continued)

*Primary Examiner* — Alex Kok S Liew
(74) *Attorney, Agent, or Firm* — KDW FIRM PLLC

(57) ABSTRACT

Disclosed herein is a system and method for generating quadrilateral bonding boxes which tightly cover the most representative faces of retail products having arbitrary poses. The quadrilateral boxes do not include unnecessary background information or miss parts of the objects, as would the axis-aligned bounding boxes produced by prior art detectors. A simple projection transformation can correct the pose of products for downstream tasks.

22 Claims, 8 Drawing Sheets

(51) Int. Cl.
    *G06V 10/44*      (2022.01)
    *G06V 10/764*    (2022.01)

(58) Field of Classification Search
    CPC .... G06V 20/20; G06V 2201/08; G06V 10/25;
             G06V 10/774; G06V 20/64; G06V
             40/172; G06V 10/255; G06V 20/00;
             G06V 20/647; G06V 20/70; G06V
             40/171; G06V 10/16; G06V 10/446;
             G06V 10/806; G06V 2201/07; G06N
             3/08; G06N 3/045; G06N 3/044; G06N
             7/01; G06N 3/04; G06N 3/084; G06N
             5/046; G06N 7/02; G06N 20/00; G06N
             20/10; G06N 3/008; G06N 3/0455; G06N
             3/0464; G06N 3/0475; G06N 3/094;
             G06N 3/006; G06N 5/048
    See application file for complete search history.

(56)           References Cited

U.S. PATENT DOCUMENTS

| | | | |
|---|---|---|---|
| 2018/0330198 A1 | 11/2018 | Harary | |
| 2019/0057507 A1 | 2/2019 | El-Khamy | |
| 2019/0096086 A1* | 3/2019 | Xu | G06T 7/60 |
| 2019/0145765 A1 | 5/2019 | Luo | |
| 2019/0294889 A1 | 9/2019 | Sriram | |
| 2019/0325243 A1 | 10/2019 | Sikka et al. | |
| 2020/0025931 A1 | 1/2020 | Liang | |
| 2020/0211202 A1* | 7/2020 | Zhang | G08B 21/0476 |
| 2020/0364876 A1 | 11/2020 | Mohan et al. | |
| 2021/0001885 A1 | 1/2021 | Zhang | |
| 2021/0012116 A1 | 1/2021 | Urtasun | |
| 2021/0156963 A1 | 5/2021 | Popov | |
| 2021/0157006 A1 | 5/2021 | Sun | |
| 2021/0366099 A1 | 11/2021 | Liao et al. | |
| 2022/0051094 A1* | 2/2022 | Chentanez | G06N 3/04 |
| 2024/0104761 A1 | 3/2024 | Savvides | |

OTHER PUBLICATIONS

T.-Y. Lin, P. Dollár, R. Girshick, K. He, B. Hariharan and S. Belongie, "Feature Pyramid Networks for Object Detection," 2017 IEEE Conference on Computer Vision and Pattern Recognition (CVPR), Honolulu, HI, USA, 2017, pp. 936-944 (Year: 2017).*
Fathi et al., "Semantic Instance Segmentation via Deep Metric Learning" Mar. 30, 2017 arXiv:1703.10277 [cs.CV].
International Search Report and Written Opinion for the International Application No. PCT/US22/19553, mailed Jul. 12, 2022, 13 pages.
International Search Report and Written Opinion for the International Application No. PCT/US22/52219, mailed Jun. 15, 2023, 7 pages.

* cited by examiner

Irrelevant background

Parts are cut out (a)          (b)

SYSTEM AND METHOD FOR USING NON-AXIS ALIGNED BOUNDING BOXES FOR RETAIL DETECTION

RELATED APPLICATIONS

This application claims the benefit of U.S. Provisional Patent Application No. 63/167,709, filed Mar. 30, 2021, the contents of which are incorporated herein in their entirety.

BACKGROUND

In a retail setting, it is desirable to be able to use computer vision methods to detect and identify products on a retail shelf to aid in management of the retail establishment. For example, computer vision may be used to detect and identify products for various tasks, such as tracking product inventory, determining out-of-stock products and determining misplaced products. Product detection is one of the fastest-moving areas and plays a fundamental role in many retail applications such as product recognition, planogram compliance, out-of-stock management, and check-out free shopping.

To this end, numerous computer vision methods have been developed and many real-world applications based on those computer vision methods perform at a satisfactory level. Currently, various visual sensors (e.g., fixed cameras, robots, drones, and mobile phones) have been deployed in retail stores, enabling the application of advanced technologies to ease shopping and store management tasks.

Object detectors typically comprise a localization sub-network that feeds downstream tasks, such as pose estimation, fine-grained classification, and similarity matching. Most downstream tasks require that the localization sub-network provide a bounding area for each object, for example, products in a retail setting. Therefore, for scene understanding in 2D images, the first step is to detect the objects and represent them by 2D bounding boxes. It is crucial to ensure that the bounding boxes are well aligned with the detected objects to provide accurate information about the products for the downstream tasks. The bounding box is expected to cover the most representative pixels and accurately locate the product while concurrently excluding as much noisy context, as possible, such as background. Retail scene product detection typically output axis-aligned bounding boxes (AABB) regardless of the pose of the product.

However, products can be of arbitrary poses in a real-world retail scene, especially when the image is taken by a camera not facing straight towards the shelf, as shown in FIG. 1. Because of mutual occlusion, rotation, distortion, and restricted shooting angles in retail scenarios, previous datasets and detectors have difficulty drawing proper bounding boxes to satisfy these requirements because an AABB is not able to be perfectly aligned with the actual boundaries of the ill-posed products. If AABBs are used as the bounding box shape to annotate the products, there will always be irrelevant background included in the boxes or parts of the products will be cut out, as shown in FIG. 1. As such, the most precise object regions cannot be retrieved. Therefore, the features extracted from these object regions may not be accurate for the downstream tasks.

SUMMARY

To address the issues identified above, disclosed herein is a system and method implementing an object detector for predicting non-AABB, convex-shaped regions of interest whose edges are tightly aligned with the boundaries of arbitrarily posed objects. In one embodiment, the objects may be retail products.

In one embodiment, the system and method generates quadrilateral boxes which tightly cover the most representative faces of the retail products. The detector disclosed herein represents the quadrilateral boxes by a central point and four offsets. The system and method provides two benefits compared to the conventional AABB format. First, the quadrilateral boxes do not include unnecessary background information or miss parts of the objects, so that features extracted from the predicted bounding boxes are precise and informative. Second, a quadrilateral box itself already encodes some pose information of the enclosed object. With a simple 2D projection transformation, the pose can be normalized as if the camera is facing straight towards the object. Thus, a simple projection transformation can be applied to correct the pose of products for downstream tasks.

In other embodiments, other convex shapes, for example, triangles or ellipses, may be predicted as the bounding boxes.

BRIEF DESCRIPTION OF THE DRAWINGS

By way of example, a specific exemplary embodiment of the disclosed system and method will now be described, with reference to the accompanying drawings, in which:

FIG. 6(*c*) shows the quad-centeredness map with a shrunk ratio applied.

DETAILED DESCRIPTION

Figure 1:
FIG. 1 is an illustration showing that axis-aligned bounding boxes often include irrelevant background information or cut out parts of the product when the products are ill-posed.
Figure 2:
FIG. 2 is an illustration showing the bounding boxes of the quadrilateral detector disclosed herein.

There are two aspects to the disclosed invention. In the first aspect, a quadrilateral training dataset containing images of retail products annotated with quadrilateral-shaped bounding boxes is developed and used to train the quadrilateral detector. In the second aspect, a strong quadrilateral detector is disclosed that out-performs prior art detectors on the quadrilateral training dataset. The detector produces quadrilateral bounding boxes, as shown in FIG. 2, that provide the advantages of excluding unnecessary background information and more precisely including pixels representing the actual product.

Quadrilateral Training Dataset

Figure 3:
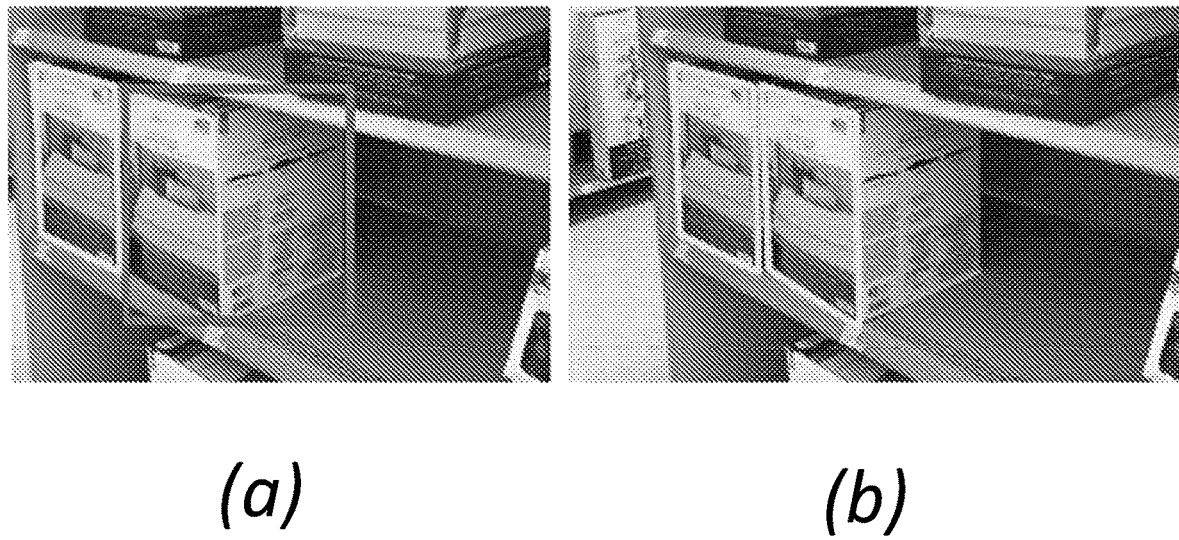
FIG. 3(*a*) is an illustration showing how an axis-aligned bounding box captures multiple faces of the same product, whereas FIG. 3(*b*) shows that the quadrilateral detector captures only the front-facing surface of the product container.

The training database is designed with three features to solve the aforementioned challenges: (1) bounding boxes of products are densely labeled in quadrilateral style by well-trained annotators and multiple rounds of re-correction. Exemplary bounding box annotations are illustrated in FIG. 2. Quadrilaterals can adequately reflect the shape and pose of most products like boxes, bottles, cans, chests, and bags regardless of the shooting angles, and efficiently handle the irregular cases like clothes, balls, sunglasses, etc.; (2) the quadrilateral bounding box annotations only cover the front face of products (See FIG. 3(b)) when multiple faces are visible, as opposed to AABB, which would cover all exposed faces (See FIG. 3(a)). The front face of the products provide the most distinguishing information about the product and keeps the appearance consistent for the same products; and (3) two different testing sets support two product detection tasks: origin-domain detection and cross-domain detection. One testing set shares the domain with the training set, while another is independently collected from different stores, with different shooting equipment, and at more difficult shooting angles.

Image Collection—Practically, a variety of sensors are utilized under different conditions for on-shelf product detection. The resolution and shooting angles cover an extensive range by different types of sensors. Specifically, robots usually take high brightness pictures from the bottom up using high-quality cameras and build-in light source, shaping most products into a trapezoid shape. Fixed cameras are, in most cases, mounted on the ceiling, creating low-resolution images from top to bottom; staff and customers prefer to photograph with mobile phones from the front or side, shaping products into a rhomboid shape. The product categories sold in different stores also show a great deal of variety.

Considering these factors, images are collected from two sources to support origin-domain and cross-domain detection. In the origin domain, training and testing images share a similar style and are pictured at similar angles in the same stores by the same sensors. As a result, images are selected from a prior product dataset to form the origin domain.

These images have three properties: (1) They are collected from a limited number (e.g., <5) of stores worldwide; (2) All images are shot by humans holding mobile phones from side or front perspectives; and (3) The diversity of categories is rich but still highly limited.

In the cross domain, approximately 500 images are collected in 5 different stores (100 for each) from multiple sensors, cover unseen categories, and mimic the view angles of fixed cameras and robots.

Annotation—Each product is annotated with a quadrilateral bounding box, referred to here as a "QUAD". A QUAD refers to 4 points $p_{tl}$, $p_{tr}$, $p_{br}$, $p_{bl}$ with 8 degrees of freedom $(x_{tl}, y_{tl}, x_{tr}, y_{tr}, x_{br}, y_{br}, x_{bl}, y_{bl})$ For regular shaped products mainly in cuboid and cylinder containers, the $(x_{tl}, y_{tl})$ is defined as the top-left corner of the front face of the product, and the other points represent the other corners in clockwise order. For spheres, cones, and other cases, for which it is hard to identify corners, or front faces, and for irregular-shaped products where such defined quadrilaterals cannot cover the entire front face, the minimum AABB is first drawn and the four corners are then adjusted following the perspective transformation. The front face has the most representative information and is also critical for consistent appearance, but the side face is still annotated if the front face is invisible.

In one embodiment, in total, 1,777,108 QUADs are annotated by 13 well-trained annotators in 3 rounds of correction. The origin domain is split to training (8,216 images, 1,215,013 QUADs), validation (588 images, 92,128 QUADs), and origin-domain testing set (2,940 images, 432,896 QUADs). The cross domain composes the cross-domain testing set (500 images, 37,071 QUADs).

Quadrilateral Detector

A strong baseline quadrilateral detector designed exclusively for quadrilateral product detection is disclosed. The base network will be introduced first. Afterward, a quadrilateral ground-truth assignment strategy is disclosed. Finally, a corner refinement module is disclosed.

Figure 4:
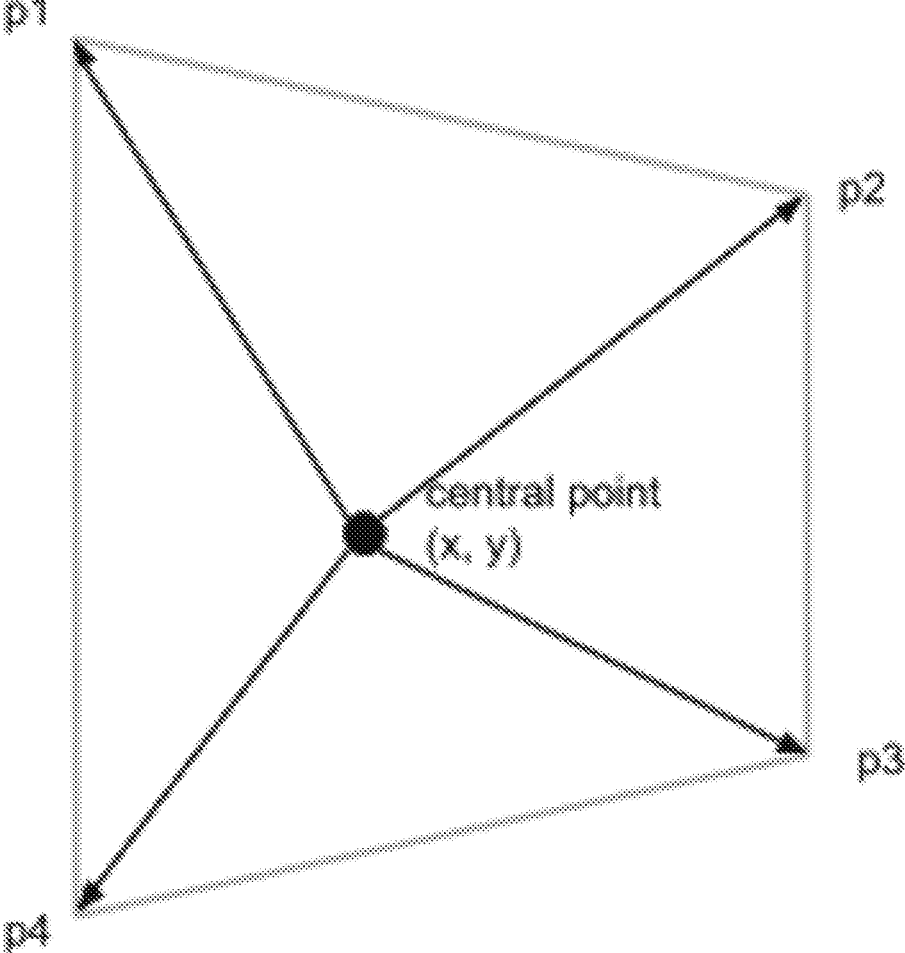
FIG. 4 is a representation of an exemplary quadrilateral bounding box produced by the quadrilateral detector disclosed herein, represented by a central point and four distance offsets to specify the coordinates of the corners of the box.

The quadrilateral detector extends the localization subnet to have different output definitions. In one embodiment, a quadrilateral box is represented as $Q=\{p_i|i\in\{1, 2, 3, 4\}\}$, where $p_i=\{x_i, y_i\}$ are vertices of the bounding box, as shown in FIG. 4. The localization subnet has 4 additional channels (8 channels total, 4 pairs) in the output map. Each pair of channels correspond to the distance offset $(\Delta x_i, \Delta y_i)$ from the central points to $p_i$ if the central points are positive. During training, the offsets are normalized by the feature stride and smooth L1 loss is applied for optimization.

Figure 5:
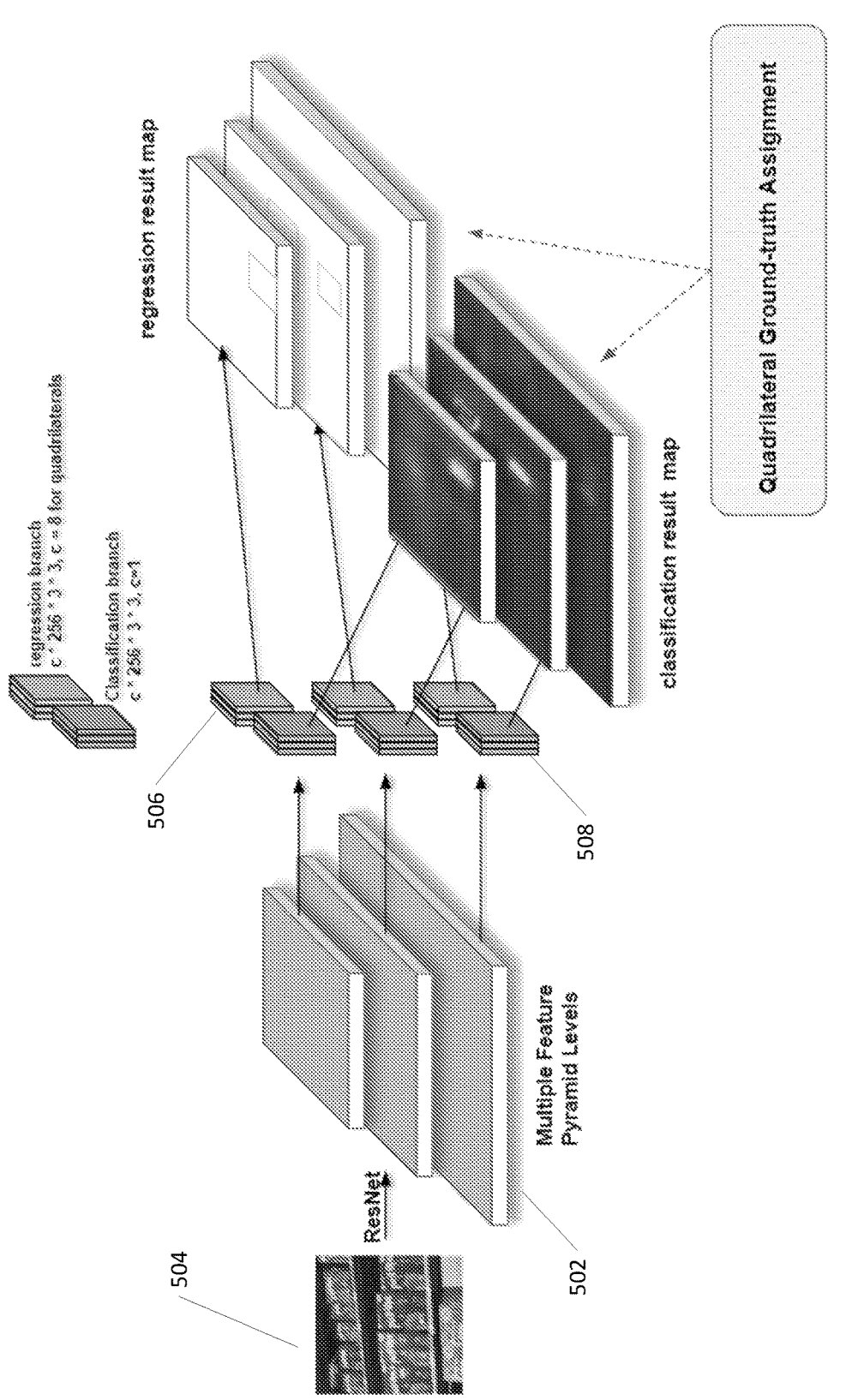
FIG. 5 is an architectural diagram of the base network.

Base Network—An architectural diagram of the base network appears in FIG. 5. The design of the base network applies a prior-art DenseBox-style head to multiple feature pyramid levels. The feature pyramid 502 is generated via a feature pyramid network (FPN) which utilizes a deep convolutional network as the backbone. As an image 504 is fed into the backbone and several feature maps are extracted to compose the initial feature pyramid. The ResNet family is adopted as the backbone, and the extracted feature maps are from $C_3$ to $C_5$. Generally, low feature pyramid levels have high resolution but weak semantic information (i.e., these feature maps are gradually down-sampled but semantically enhanced). The FPN leverages a top-down module that up-samples the high feature pyramid levels and sums them to the adjacent lower levels to enhance semantic information. The feature maps after the FPN are denoted as $P_3$, $P_4$, $P_5$. An anchor free detection head is then attached. The head contains two branches. One is a binary classification branch 506 to predict a heatmap for product/background. Another is a regression branch 508 to predict the offset from the pixel location to the four corner points of the QUAD. Each branch consists of 3 stacks of convolutional layers followed by another c channel convolutional layer, where c=1 for the classification branch and c=8 for the regression branch.

Quadrilateral Ground-truth Assignment—The ground-truth assignment strategy plays a vital role in the training phase. Here, two aspects are focused on: (1) on-map assignment; and (2) cross-pyramid assignment.

On-map: Quadrilateral Centerness—The common definition of the centerness of an AABB is shown in Eq. (1):

$$C_{AABB}(p_{ij}) = \left[\frac{\min\left(d^l_{pij}, d^r_{pij}\right)}{\max\left(d^l_{pij}, d^r_{pij}\right)} \cdot \frac{\min\left(d^t_{pij}, d^b_{pij}\right)}{\max\left(d^t_{pij}, d^b_{pij}\right)}\right]^{0.5} \quad (1)$$

By Eq. (1), the feature pixel $p_{ij}$ at position (i, j) is considered as the "center point" if it keeps the same distances to the left and right AABB boundaries $$\left(d^l_{p_{ij}} \text{ and } d^r_{p_{ij}}\right),$$

and, concurrently, keeps the same distances to the top and bottom AABB boundaries $$\left(d^t_{p_{ij}} \text{ and } d^b_{p_{ij}}\right).$$

This is denoted it as the "AABB center". The AABB center has the highest centerness as 1, and the other pixels have degraded centerness calculated by Eq. (1). However, when adopting the AABB center to quadrilaterals, as shown in FIG. 6(a), the center can be far away from a corner, which leads to unbalanced regression difficulty and lack of receptive field from that corner.

Figures 6A, 6B, 6C:
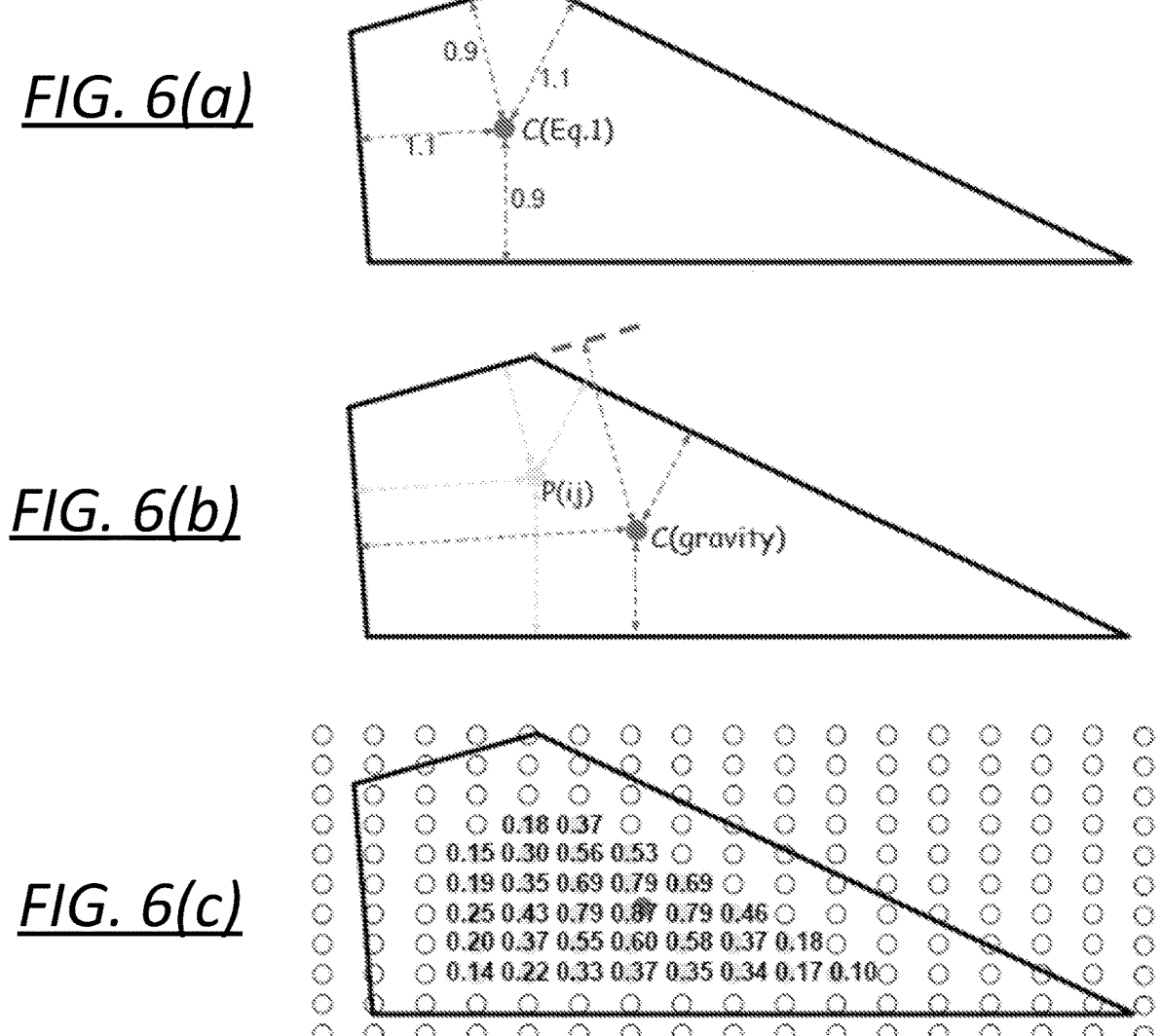
FIG. 6 is an illustration showing an AABB center applied on a QUAD (FIG. 6(*a*)), as opposed to a gravity center (FIG. 6(*b*)).

To solve the above problem, the "QUAD center" is defined as the center of gravity, not only because it is the geometric center of the QUAD but also because it represents the mean position of all the points in the shape, which mitigates the unbalanced regression difficulties, as shown in FIG. 6(b). Eq. (2) can then be used to calculate the quad-centerness for any $p_{ij}$:

$$C_{QUAD}(p_{ij}) =$$

$$\left[\frac{\min\left(d^l_{p_{ij}}, d^l_g\right)}{\max\left(d^l_{p_{ij}}, d^l_g\right)} \cdot \frac{\min\left(d^r_{p_{ij}}, d^r_g\right)}{\max\left(d^r_{p_{ij}}, d^r_g\right)} \cdot \frac{\min\left(d^t_{p_{ij}}, d^t_g\right)}{\max\left(d^t_{p_{ij}}, d^t_g\right)} \cdot \frac{\min\left(d^b_{p_{ij}}, d^b_g\right)}{\max\left(d^b_{p_{ij}}, d^b_g\right)}\right]^{0.5} \quad (2)$$

where:

g denotes the gravity center;

$$d^{l/r/t/b}_g$$

denotes the distances between the gravity center g and the left/right/top/bottom boundaries; and $$d^{l/r/t/b}_{p_{ij}}$$

denotes the distances between the $p_{ij}$ and the boundaries.

If $p_{ij}$ locates on the gravity center, its quad-centerness has the highest value as 1. Otherwise, the quad-centerness are gradually degraded, as shown in FIG. 6(c).

It is mentionable that the centerness calculated by Eq. (1) is a special instantiation of the quad-centerness calculated by Eq. (2). This is because, when QUAD is specialized to an AABB, $$d^l_g = d^r_g$$

and $$d^l_{p_{ij}} = 2d^l_g$$

such that Eq. (2) is mathematically equivalent to Eq. (1).

Cross-Pyramid: Soft Scale—A fast assignment strategy across pyramid levels is crucial for training where each image contains hundreds of objects. Prior strategies are typically scale-based (i.e., assigning objects to different levels in terms of their scales). The larger the scale, the higher the level to which the objects are assigned, so that the needs of receptive field and resolution of feature maps are well balanced. Recently, a new loss-based strategy has been proposed, termed Soft Selection, where object scale does not indicate pyramid level. Instead, it first assigns each object to all pyramid levels $P_3$, $P_4$, $P_5$ and calculates boss/for each level $P_l$ (which, in this case, l=3, 4, 5). Then, the level that produces the minimal loss is converted to a one-hot vector (i.e., (1,0,0)) if the minimal loss is from $P_3$; (0,1,0) if it is from $P_4$, and so on). The vector is used as the ground-truth to train an auxiliary network that simultaneously predicts a vector ($F_3$, $F_4$, $F_5$). Each element $F_l$ is a down-weighting factor for loss$_l$. The final loss of each object is $\Sigma_l(F_l \cdot \text{loss}_l)$.

The Soft Selection outperforms scale-based strategies on generic datasets. However, it is highly inefficient because it independently calculates losses for each object and slowly trains the auxiliary network. In practice, when the number of instances per image becomes large, the training process takes exceptionally longer (~4x-5x) than scale-based strategies.

The merit of Soft Selection can be maintained while accelerating the assignment by accounting for the relationship between loss and scale. By Soft Selection, the minimal loss from level l indicates that the auxiliary network is trained to generate a relatively larger $F_l$, but the loss is not independent of scales. On the contrary, object scale inherently determines which level will produce the minimal loss. The reason is as follows. First, when assigning objects (e.g., object A with size 8×8 and B with size 16×16) to the pyramid, their regression targets (denoted as $T_A$, $T_B$) are normalized by the level stride. Specifically, on a lower level (like $P_3$), the target is divided by stride 8, while on a higher level (like $P_4$), the target is divided by 16, and so on. Therefore, when assigning A to $P_3$ and $P_4$, $T_A$ is 1×1 and 0.5×0.5, respectively; when assigning B, $T_B$ is 2×2 and 1×1, respectively. Note that all levels share the detection head. The combination of and $T_A$=1×1 and $T_B$=1×1 leads to the smallest regression difficulty for the regression head. Naturally, it produces minimal regression losses, which means the smaller object is assigned to a lower level. Second, because A has a smaller scale, it requires more local fine-grained information beneficial for classification, which is more available from high-resolution, lower levels. In comparison, B has a larger scale and needs a larger receptive field, which is more available from higher levels. Therefore, the "loss-based" Soft Selection, in essence, follows the scale-based law.

Nevertheless, Soft Selection outperforms scale-based strategies. The improvement can be credited to its loss reweighting mechanism. This mechanism involves multiple levels during training and reweights the loss in terms of the regression and classification difficulties, making optimization easier. Because the pyramid is discrete, if an object scale falls into the gap of two adjacent levels, the difficulty of both levels will be similar. The auxiliary network has opportunities to learn to predict proper $F_l$ for both levels.

The analysis motivates the abandonment of the auxiliary network and design a scale-based solution named Soft Scale (SS). For an arbitrary shaped object O with area $Area_O$, SS assigns the object to two adjacent levels $P_{ii}$ and $P_{lj}$ by Eqs. (3) and (4) and calculates the loss-reweighting factors $F_{li}$, $F_{lj}$ by Eqs. (5) and (6) respectively.

$$l_i = \left\lceil l_{org} + \log_2 \sqrt{Area_O}/224 \right\rceil \quad (3)$$

$$l_j = \left\lfloor l_{org} + \log_2 \sqrt{Area_O}/224 \right\rfloor \quad (4)$$

$$F_{l_i} = l_{org} + \log_2 \sqrt{Area_O}/224 - \left\lfloor l_{org} + \log_2 \sqrt{Area_O}/224 \right\rfloor \quad (5)$$

$$F_{l_j} = 1 - F_{l_i} \quad (6)$$

Eq. (4) is borrowed from FPN, where 224 is the ImageNet pre-training size. Objects with exact area 224$^2$ are assigned to $l_{org}$, in which case $l_i=l_j=l_{org}$. If an object is with area $223^2$, FPN assigns it to $(l_{org}-1)$, while SS assigns it to $l_{org}$ with $F_{l_{org}}=0.994$ and to $(l_{org}-1)$ with $F_{l_{org}}=0.006$. Herein, $l_{org}$ is fixed at 5. SS operates as rapidly as scale-based strategies, keeps the loss-reweighting like Soft Selection, and greatly improves the performance of the quadrilateral detector.

Corner Refinement Module—A corner refinement module (CRM) is provided to make the quadrilateral detector two-stage. For each predicted QUAD from the quadrilateral detector, the locations of its four corners and center are obtained. Bilinear interpolation is then used to extract five features (4 corners and one center) from the feature map generated by the 3rd stacked convolution in the regression branch. These features are concatenated and fed into a 1×1 convolutional layer to predict the difference between ground-truth and the previous prediction. The same operation and convolution are also inserted in the classification branch to predict object/background as a 2nd-stage classification. During testing, the regression results from the two stages are combined but only the classification result from the first stage is trusted. CRM shares the sprits with Faster-RCNN, but the 5 points mentioned above are enough for quadrilateral products, and the 2nd-stage classification supervision helps training, though not involved in testing.

Losses—During training, the QUADs are first shrunk by a ratio according to the gravity centers. If one feature pixel locates inside the shrunk QUAD, the pixel is considered responsible for learning the ground-truth. Focal loss is utilized for classification and SmoothL1 loss is used for regression. Both losses are re-weighted by the production of quad-centerness and level reweighting factor F. The total loss is the summation of the classification and regression losses. If two-stage, additional focal loss and L1 loss for CRM are added to the total loss.

Alternate Embodiments

In alternate embodiments of the invention, shapes other than a quadrilateral may be chosen for the bounding box.

Figure 7:
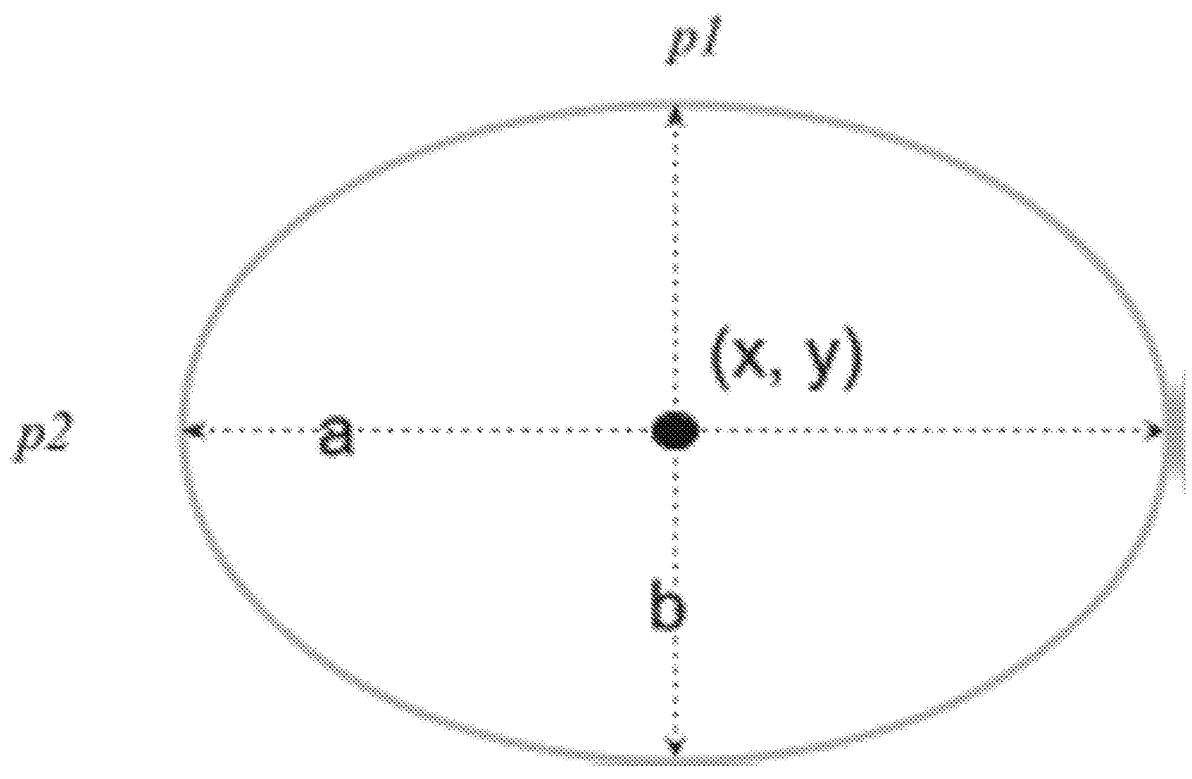
FIG. 7 is a representation of the elliptical shaped bounding box represented using a center point and two distance offsets representing the lengths of the major and minor axes of the ellipse.

In one alternate embodiment, an elliptical or circle bounding shape may be used, as shown in FIG. 7. The box is represented as R={x, y, a, b}, where (x, y) are the coordinates of the center and (a, b) are the length of two axes as the vertices for the bounding shape. The localization subnet has a total of 4 channels in the output map. Two of them correspond to the distance offset $(\Delta x_i, \Delta y_i)$ from the central points to (x, y) if the central points are positive. The other two correspond to the lengths of the major and minor axes (a, b) of the ellipse. During training, the offsets are normalized by the feature stride and a smooth L1 loss is applied for optimization.

Figure 8:
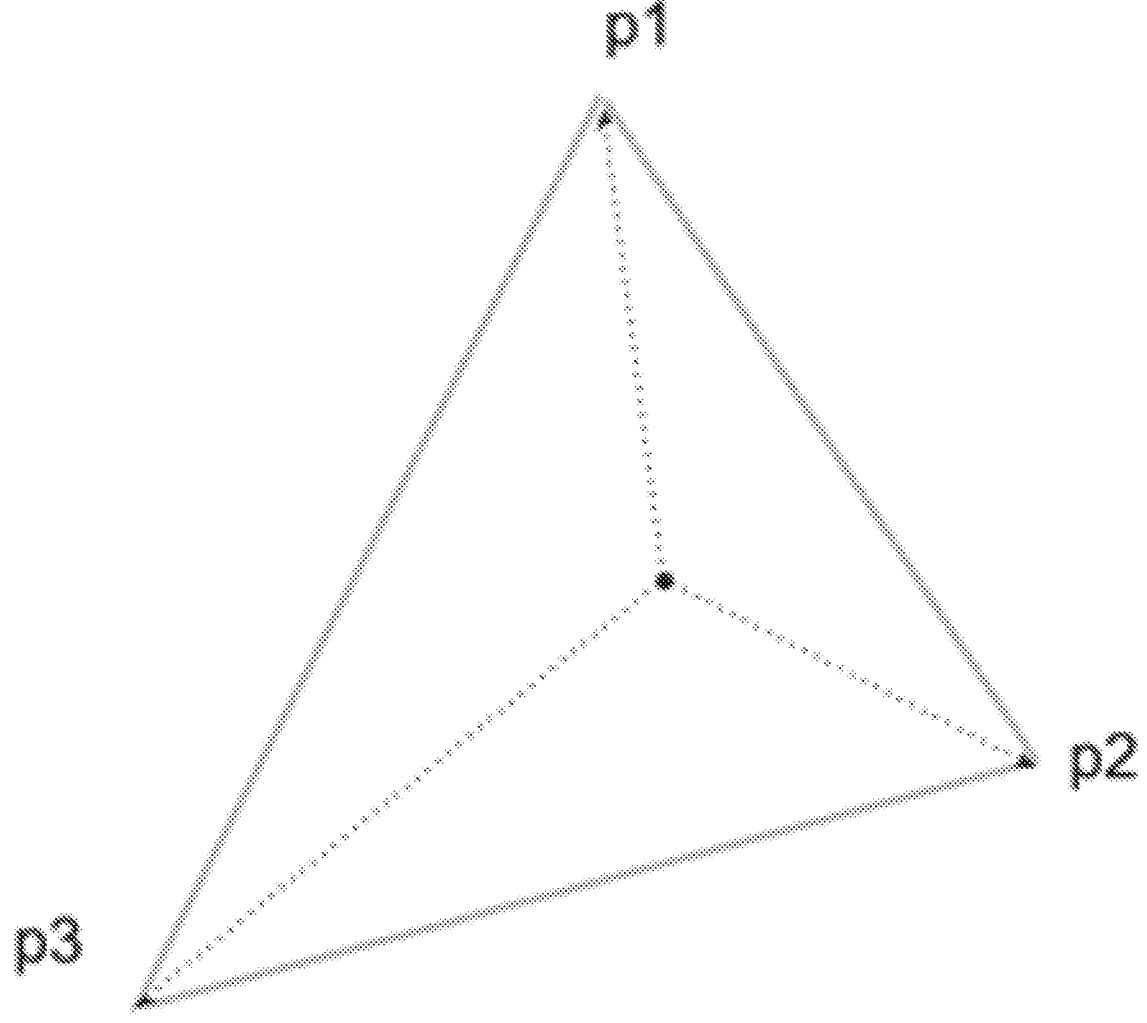
FIG. 8 is a representation of a triangular shaped bounding box represented using a central point and three distance offsets representing the coordinates of the vertices of the triangle.

In a second alternate embodiment, a triangular bounding shape may be used, as shown in FIG. 8. In this case, the box is represented as T={$p_i|i\in\{1,2,3\}$}, where $p_i=\{x_i, y_i\}$ are vertices of the triangle. The localization subnet has a total of 6 channels in the output map. Each two channels correspond to the distance offset $(\Delta x_i, \Delta y_i)$ from the central points to $p_i$ if the central points are positive. During training, the offsets are normalized by the feature stride and smooth L1 loss is applied for optimization.

In yet a third alternate embodiment, the quadrilateral detector can be extended for generating 3D bounding boxes with arbitrary poses. The detector can output N channels from the localization subnet, where N is the minimal number of parameters to represent the 3D shape. For example, in a cuboid with rectangle faces, N is twice the number of vertices. In a sphere, N is 3 which corresponds to the distance offset from the central point to the sphere center and the radius.

As would be realized, other 2D and 3D shapes for the bounding box may be contemplated to be within the scope of the invention.

This disclosed quadrilateral detector may be used for pose normalization of the detected bounding boxes. The bounding boxes, are not necessarily bound by width and height displacement from the center. Thus, the bounding boxes can provide 4 independent points on the detected object and can capture the shear in the objects. The bounding boxes may be pose corrected by projecting the sheared boxes onto a reference plane through a homography matrix or any other transformation to help in pose normalization for matching.

Product detection is challenging and fundamental in the retail industry. Herein is disclosed a new dataset and a customized quadrilateral detector, which detects products as quadrilaterals as opposed to AABBs. As would be realized by one of skill in the art, the disclosed method described herein can be implemented by a system comprising a processor and memory, storing software that, when executed by the processor, performs the functions comprising the method.

As would further be realized by one of skill in the art, many variations on implementations discussed herein which fall within the scope of the invention are possible. Moreover, it is to be understood that the features of the various embodiments described herein were not mutually exclusive and can exist in various combinations and permutations, even if such combinations or permutations were not made express herein, without departing from the spirit and scope of the invention. Accordingly, the method and apparatus disclosed herein are not to be taken as limitations on the invention but as an illustration thereof. The scope of the invention is defined by the claims which follow.

The invention claimed is:

1. A system implementing a trained object detector comprising:
    a localization sub-network taking an image as input and outputting one or more non-axis-aligned bounding boxes enclosing one or more objects detected in the image, the localization sub-network comprising:
        a backbone network for extracting multiple feature maps from the image, the feature maps forming a feature pyramid network that up-samples high feature pyramid levels and sums them to adjacent lower levels to enhance semantic information in the lower levels;

a two-branched anchor-free detection head having a binary classification branch to predict a heatmap for object/background from the feature pyramid and a regression branch to predict offsets from pixel locations to the four corner points of a quadrilateral from the feature pyramid; and a corner refinement module for determining locations of four corners and a center of the quadrilateral from output of the regression branch, wherein the center of the quadrilateral is a gravity center;

one or more downstream modules using the output of the localization sub-network.

2. The system of claim 1 wherein the localization sub-network outputs non-axis aligned quadrilateral-shaped bounding boxes.

3. The system of claim 2 wherein the quadrilateral-shaped bounding boxes are defined by a center point and four pairs of coordinates defining vertices of the quadrilateral as offsets from the center point.

4. The system of claim 1 wherein the backbone network is Resnet.

5. The system of claim 1 wherein the binary classification branch predicts a heatmap for differentiating objects from background in the image.

6. The system of claim 5 wherein the binary classification branch comprises three stacks of convolutional layers followed by a single-channel convolutional layer.

7. The system of claim 1 wherein the regression branch predicts the offsets from the central point defining the vertices of the quadrilateral bounding box.

8. The system of claim 7 wherein the regression branch comprises three stacks of convolutional layers followed by an eight-channel convolutional layer.

9. The system of claim 8 wherein the localization sub-network is trained on a dataset comprising images annotated with ground-truth quadrilateral-shaped bounding boxes.

10. The system of claim 9 wherein a soft scale strategy is used to assign object to levels of the feature pyramid, wherein each object is assigned to two adjacent levels of the feature pyramid.

11. The system of claim 1, wherein the corner refinement module:

extracts features representing the central point and four vertices of the quadrilateral bounding box regression branch;

concatenates the features; and inputs the concatenated features to a 1×1 convolutional layer to predict differences between ground-truth and a previous prediction of the features of the quadrilateral bounding box.

12. The system of claim 10 wherein a loss applied to the detector is a sum of the losses from the regression branch and the binary classification branch.

13. The system of claim 1 further comprising:

a processor; and memory, containing instructions that, when executed by the processor, causes the system to implement the object detector.

14. The system of claim 1 further comprising:

a processor; and memory, containing instructions that, when executed by the processor, causes the system to train the object detector.

15. The object detector of claim 1 wherein a projection transformation is applied to the non-axis aligned quadrilateral bounding boxes to correct the pose of the objects for the downstream modules.

16. The system of claim 1 wherein the downstream modules perform tasks including one or more of pose estimation, classification and similarity matching.

17. The system of claim 1 wherein the localization sub-network outputs triangle-shaped bounding boxes.

18. The system of claim 17 wherein the triangle-shaped bounding boxes are defined by a center point and three pairs of coordinates defining vertices of the triangle as offsets from the center point.

19. The system of claim 1 wherein the localization sub-network outputs elliptical-shaped bounding boxes.

20. The system of claim 19 wherein the elliptical-shaped bounding boxes are defined by a center point and two channels defining lengths of minor and major axes of the ellipse.

21. The system of claim 1 wherein the localization sub-network outputs three-dimensional bounding boxes.

22. The system of claim 21 wherein the three-dimensional bounding boxes are defined by a center point and N channels defining parameters of the three-dimensional shape.

* * * * *